(12) United States Patent
Oprescu-Surcobe et al.

(10) Patent No.: US 7,499,418 B2
(45) Date of Patent: Mar. 3, 2009

(54) METHOD AND APPARATUS FOR SIGNALING AD-HOC GROUP OF MOBILE UNITS

(75) Inventors: Valentin Oprescu-Surcobe, Northbrook, IL (US); John M. Harris, Chicago, IL (US); Sean S. Kelley, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/403,349

(22) Filed: Apr. 13, 2006

(65) Prior Publication Data

US 2006/0251033 A1    Nov. 9, 2006

Related U.S. Application Data

(60) Provisional application No. 60/673,077, filed on Apr. 20, 2005.

(51) Int. Cl.
*G08C 17/00*    (2006.01)
*H04Q 7/00*    (2006.01)

(52) U.S. Cl. .......................... 370/311; 370/328
(58) Field of Classification Search ............. None
See application file for complete search history.

(56) References Cited

U.S. PATENT DOCUMENTS 6,636,745 B2  10/2003  Oprescu-Surcobe et al.
6,680,920 B1 *  1/2004  Wan .......................... 370/311
2004/0176112 A1  9/2004  Beckmann et al.

FOREIGN PATENT DOCUMENTS

WO    WO 96/31992 A1    10/1996

* cited by examiner

*Primary Examiner*—Firmin Backer
*Assistant Examiner*—Clemence Han

(57) ABSTRACT

Various embodiments are described for signaling an ad-hoc group of mobile units (MUs). The ad-hoc group may be a group of MUs for which signaling awaits transmission via a wireless communication resource (111). Signaling such a group involves deriving a mobile unit group identifier (MUGI) by combining individual mobile unit identifiers (MUIs) of the targeted ad-hoc group. The individual MUIs are either an identifier of each MU or derived from an identifier of each MU. The derived MUGI is then included in combined signaling that is transmitted (by RAN 121, e.g.) via the wireless communication resource. A receiving MU (101) determines whether the MUGI could have been derived from its MUI in combination with at least one other MU's MUI. When it determines that the MUGI could have been derived from its MUI, the receiving MU processes the signaling as directed to itself.

22 Claims, 4 Drawing Sheets

| FIELD | LENGTH (BITS) |
|---|---|
| RESERVED | 2 |
| ACK_REQ | 1 |
| PERSISTENCE | 1 |
| RESPONSE MESSAGE | 1 |
| SERVICE_ID | 4 |
| ALL_DONE | 1 |
| HB1_BITMAP_29 | 29 |
| HB1_BITMAP_31 | 31 |
| HB1_BITMAP_33 | 33 |
| HB1_BITMAP_35 | 35 |

METHOD AND APPARATUS FOR SIGNALING AD-HOC GROUP OF MOBILE UNITS

REFERENCE(S) TO RELATED APPLICATION(S)

The present application claims priority from provisional application, Ser. No. 60/673,077, entitled "METHOD AND APPARATUS FOR SIGNALING AN AD-HOC GROUP OF MOBILE UNITS," filed Apr. 20, 2005, which is commonly owned and incorporated herein by reference in its entirety.

FIELD OF THE INVENTION

The present invention relates generally to communication systems and, in particular, to signaling an ad-hoc group of mobile units.

BACKGROUND OF THE INVENTION

In existing wireless communication systems, common signaling channels such as paging channels (PCHs) are in need of greater bandwidth. Today, short message service (SMS) and voice mail notification (VMN) consume a large part of PCH bandwidth, for example. The introduction of new services such as push-to-talk (PTT), presence, and "push" (which refers generally to network initiated services) will continue to worsen the PCH bandwidth situation going forward.

In today's CDMA 2000 systems a General Page Message (GPM) is used for paging. Keeping the GPM to a single frame is important, especially during times of congestion, because of the PCH bandwidth situation. In practice, only one page, addressed by IMSI (international mobile subscriber identity), can be placed in a single frame GPM, although as many as four pages addressed by IMSI can be packed into a two-frame GPM. However, using such two-frame GPMs can result in some negative effects on latency, battery life and reliability. Thus, a method and apparatus that enabled two or more mobile units to be paged in a single PCH frame would be very desirable.

BRIEF DESCRIPTION OF THE DRAWINGS

FIG. 2 is a block diagram depiction of a group page message in accordance with multiple embodiments of the present invention.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described for signaling an ad-hoc group of mobile units (MUs). The ad-hoc group may merely be a group of MUs for which signaling awaits transmission via a wireless communication resource. Signaling such a group involves deriving a mobile unit group identifier (MUGI) by combining individual mobile unit identifiers (MUIs) of the targeted ad-hoc group. The individual MUIs are either an identifier of each MU or derived from an identifier of each MU. The derived MUGI is then included in combined signaling that is transmitted via the wireless communication resource. A receiving MU determines whether the MUGI could have been derived from its MUI in combination with at least one other MU's MUI. When it determines that the MUGI could have been derived from its MUI, the receiving MU processes the signaling as directed to itself.

Figure 1:
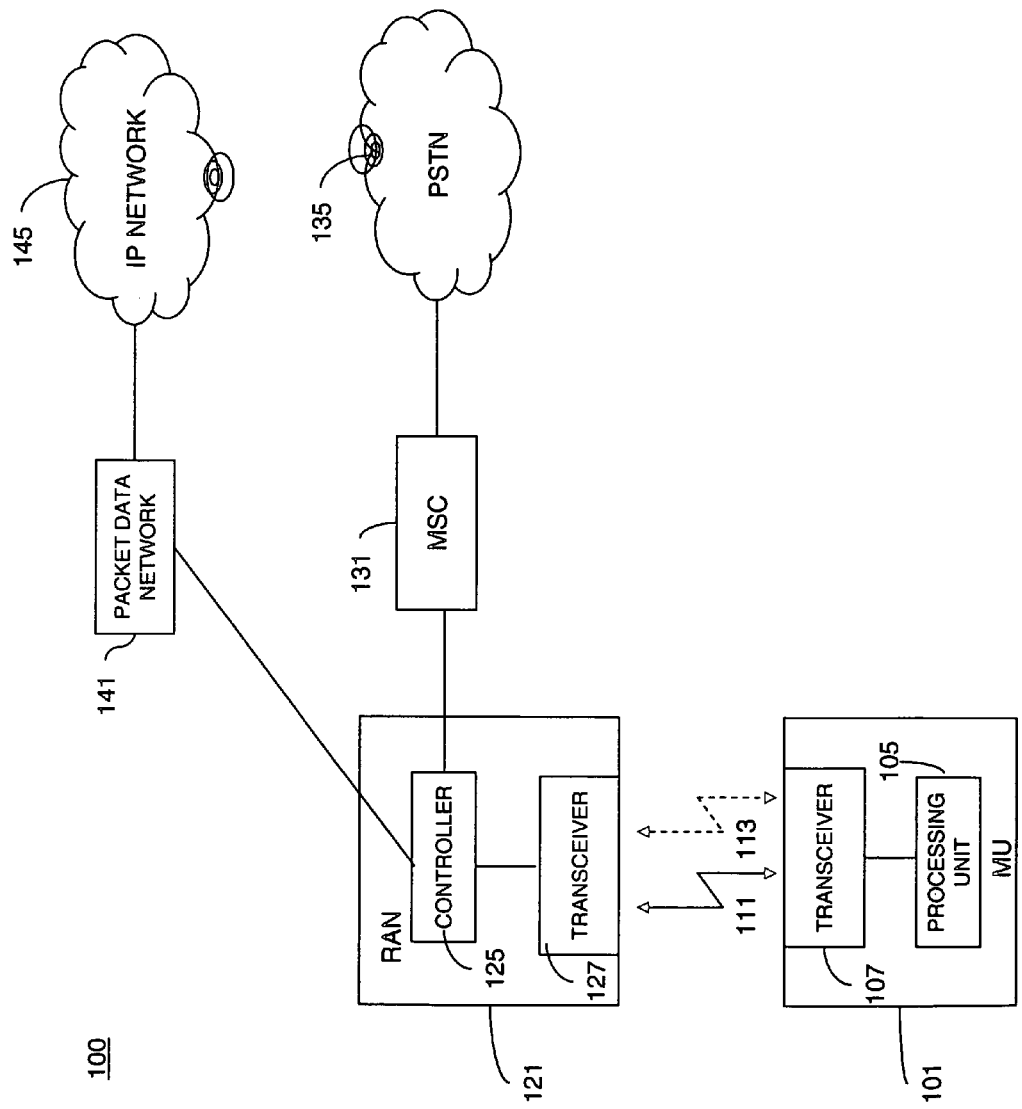
FIG. 1 is a block diagram depiction of a wireless communication system in accordance with multiple embodiments of the present invention.

The disclosed embodiments can be more fully understood with reference to FIGS. 1-4. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. (These groups may be contacted via http://www.openmobilealliance.com, http://www.3gpp.org/, http://www.3gpp2.com/ and http://www.ieee802.org/, respectively.) Communication system 100 represents a system having an architecture in accordance with one or more of the 3GPP2 technologies (e.g., IS-2000 and IS-2001), suitably modified, as needed, to implement the present invention. Alternative embodiments of the present invention may be implemented in communication systems that employ other or additional technologies such as, but not limited to, others described in the 3GPP2 specifications (e.g., HRPD (also known as 1xEV-DO)), those described in the 3GPP specifications (e.g., GSM, GPRS, EDGE, W-CDMA, UTRAN, FOMA, UMTS, HSDPA, and HSUPA), those described in the IEEE's 802 specifications, those described in the IS-136 (TDMA Third Generation Wireless Standards) specification, those described in the IS-95 (CDMA) specification, 1xEV-DV technologies, and integrated dispatch enhanced network technologies.

More specifically, communication system 100 comprises mobile unit (MU) 101, radio access network (RAN) 121, packet data network 141, IP (internet protocol) network 145, mobile switching center (MSC) 131, and public switched telephone network (PSTN) 135. Those skilled in the art will recognize that FIG. 1 does not depict all of the network equipment necessary for system 100 to operate but only those system components and logical entities particularly relevant to the description of embodiments herein.

For example, packet data networks are known to comprise devices such as packet data serving nodes (PDSNs), serving GPRS support nodes (SGSNs) and/or gateway GPRS support nodes (GGSNs). Also, RANs are known to comprise devices such as base transceiver stations (BTSs), access points (APs), packet control functions (PCFs), packet control units (PCUs), base site controllers (BSCs), and/or radio network controllers (RNCs), depending on which technology is employed. However, none of these devices are specifically shown in FIG. 1.

Instead, RAN 121 is depicted in FIG. 1 as comprising controller 125 and transceiver 127. In general, components such as RAN controllers and RAN transceivers are well-known. For example, RAN controllers are known to comprise basic components such as, but not limited to, microprocessors, memory devices, network interface circuitry, application-specific integrated circuits (ASICs), and/or logic circuitry. Such RAN components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging/signaling flow, a call flow, and/or a protocol specification, those skilled in the art are aware of the many design and development techniques available to implement a RAN that performs the given logic. Furthermore, those skilled in the art will recognize that aspects of the present invention may be implemented in and across various physical components and none are necessarily limited to single platform implementations. For example, the RAN aspect of the present invention may be implemented in a base transceiver station, in a base/packet controller, or across both a base transceiver station and a base/packet controller.

Thus, RAN 121 represents a known RAN that has been adapted, in accordance with the description herein, to implement multiple embodiments of the present invention. Furthermore, controller 125 and transceiver 127 is not intended to precisely correspond to a base/packet controller and base transceiver station, respectively. Rather, controller 125 and transceiver 127 each represent devices that can extend across separate physical components that perhaps are not even co-located.

As depicted in FIG. 1, RAN 121 uses an air interface comprising channel groups 111 and 113 for communication with MU 101. IS-2000 channel group 111 comprises a variety of well-known non-traffic channel types, such as broadcast, paging, access, and control (both shared and common). In contrast, IS-2000 channel group 113 comprises well-known traffic channel types, which are dynamically assigned and de-assigned to support user services.

Standards terminology refers to mobile units by terms such as mobile stations (MSs), user equipment (UE), access terminals (ATs), terminal equipment and mobile nodes (MNs). MU platforms are known to refer to a wide variety of consumer electronic platforms such as, but not limited to, cell phones, gaming devices, personal computers, and personal digital assistants (PDAs). In particular, MU 101 comprises processing unit 105, transceiver 107, a keypad (not shown), a speaker (not shown), a microphone (not shown), and a display (not shown). Processing units, transceivers, keypads, speakers, microphones, and displays as used in MUs are all well-known in the art.

For example, MU processing units are known to comprise basic components such as, but not limited to, microprocessors, digital signal processors (DSPs), microcontrollers, memory devices, application-specific integrated circuits (ASICs), and/or logic circuitry. Such MU components are typically adapted to implement algorithms and/or protocols that have been expressed using high-level design languages or descriptions, expressed using computer instructions, expressed using messaging flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic. Therefore, MU 101 represents a known MU that has been adapted, in accordance with the description herein, to implement embodiments of the present invention.

Operation of various embodiments in accordance with the present invention occur substantially as follows. In general, the various embodiments involve signaling an ad-hoc group of mobile units (MUs). The group signaled is ad-hoc in the sense that the members may only be associated or related to one another for the purpose of this signaling. They may be otherwise related or associated, perhaps as members of a call group, for example, but they need not be otherwise related. The ad-hoc group is signaled using a mobile unit group identifier (MUGI), which is derived by combining the individual mobile unit identifiers (MUIs) of the MUs in the ad-hoc group. Each MU's MUI may either be an identifier of the MU or a derivation of an identifier of the MU.

There are many possible MU identifiers upon which an MU's MUI may be based. Examples of MU identifiers include, but are not limited to, an international mobile subscriber identity (IMSI), an international mobile equipment identifier (IMEI), a mobile equipment identifier (MEID), an electronic serial number (ESN), a user identity module identifier (UIM_ID), a UMTS subscriber information module identifier (USIM_ID), a subscriber identity module identifier (SIM_ID), a temporary subscription identifier (TMSI), a media access control (MAC) identifier, a Unicast Access Terminal Identifier (UATI), and an Internet Protocol (IP) address. In some embodiments, an MU's individual MUI is derived by applying a hashing function to one of the MU's identifiers, or perhaps, to a part of the identifier.

One function that may be used for this hashing is a modulo function. In addition, whatever function is used, the result may be expressed in a variety of formats. For example, in some embodiments, the modulo result is represented by setting a single bit in a bitmap. Thus, for a bitmap having M bits, the n th bit of the M bits may be set, where n equals one plus modulo M of the MU identifier (or part of the MU identifier).

To make each MU's individual MUI more unique, its derivation may include multiple bitmaps of different lengths. For example, each MUI may include a bitmap where M=29, a bitmap where M=31, a bitmap where M=33, and a bitmap where M=35. Each of these bitmaps would have the n th bit set, where n equals one plus modulo M of the MU identifier (or part of the MU identifier).

As described above, an ad-hoc group of MUs can then be signaled using a MUGI, derived by combining the MUs' individual MUIs. For embodiments in which one or more bitmaps are employed, the individual MUIs of the ad-hoc group members may be combined by performing a bitwise logical OR of all the individual MUIs. Thus, the resulting MUGI includes one or more bitmaps having M bits, where M differs for each bitmap (e.g., M=29, M=31, M=33, and M=35), where an n th bit of the M bits is set for each MU of the ad-hoc group, and where n, for each MU of the ad-hoc group, equals one plus modulo M of the respective MU's identifier.

Embodiments in which MUIs and MUGIs have four bitmaps, with M=29, M=31, M=33, and M=35, have some desirable addressing properties. With four bitmaps, each MUI can be seen as a "point" in a 4-dimensional space, with each dimension of the "space" corresponding to one of the four bitmaps. The informational entropy of the representation scheme is fairly close to maximal for the total space (128 bits=29+31+33+35) and number of dimensions (4), since the 4 moduli are all very close to the 128/4=32 value and prime relative to each other. This results in a statistically balanced (uniform) distribution of the addresses among the bitmaps.

For a single address, the uniqueness coefficient is 1 in 29*31*33*35=1038345, i.e., approximately 1 in 1 million. This corresponds to an information entropy of roughly 20 bits. Thus, the target MU address used in computation is IMSI mod $2^{20}$, which is the same as a positive integer given by the 20 least significant bits of the IMSI.

Since the MUGI-based signaling is intended to target several MUs concurrently, the address uniqueness coefficient goes down sharply with the $4^{th}$ (because there are 4 dimensions in the space) power of the number of MUs being targeted. (The address uniqueness coefficient is the maximum theoretical size of a set of MUs, such that random targeting of one MU from the set will not probabilistically result in more than one MS being addressed. It assumes that all MUs in the set have unique identity addresses which are uniformly distributed in the addressing space.) The table below shows the variation of the uniqueness coefficient with the number of targeted MUs. In particular, it shows the equivalent uniqueness for different paging scenarios, where a MUGI is used to address a paging message.

| Number of targeted MUs | Uniqueness coefficient per 1 paging slot | Equivalent uniqueness coefficient per 16 paging slots (SCI = 0) | Equivalent uniqueness coefficient per 8 paging slots (SCI = −1) |
|---|---|---|---|
| 1 | 1 in 1000000 | 1 in 16000000 | 1 in 8000000 |
| 2 | 1 in 62500 | 1 in 1000000 | 1 in 500000 |
| 3 | 1 in 12000 | 1 in 192000 | 1 in 96000 |
| 4 | 1 in 3900 | 1 in 62400 | 1 in 31200 |
| 5 | 1 in 1600 | 1 in 25600 | 1 in 12800 |
| 6 | 1 in 770 | 1 in 12300 | 1 in 6160 |
| 7 | 1 in 415 | 1 in 6640 | 1 in 3320 |
| 8 | 1 in 240 | 1 in 3840 | 1 in 1920 |

Targeting MUs using this ad-hoc signaling approach may not always be beneficial. Again, the use of MUGIs in paging is considered. If only one mobile is targeted, signaling using a MUGI does not save any bandwidth since the current General Page Message (GPM) also requires a single frame. If two MUs are targeted, signaling using a MUGI is beneficial, potentially doubling PCH bandwidth.

For more than two MUs, however, the uniqueness coefficient should be considered when evaluating the benefit. A uniqueness coefficient of above 1 in 10,000 is probably selective enough to not result in too many potential false positives, even for very large paging zones. ("False positives" refer to MUs that are inadvertently addressed (or paged) as a result of MUGIs not being unique identifiers of the group of MUs targeted.) As the coefficient goes down, but remains above 1 in 3000, signaling using a MUGI may still be beneficial for moderate to large paging zones. Below the 1 in 3000 value, the number of potential false positives may be considered too large for MUGI-based signaling to be beneficial. However, it should be noted that "false positives" are not necessarily wasted, since they can be used to refresh presence, status, and tracking information as is described in more detail below.

As depicted in FIG. 1, RAN 121 comprises RAN controller 125 and RAN transceiver 127, while MU 101 comprises MU processing unit 105 and MU transceiver 107. RAN 121 and MU 101 communicate via non-traffic channel group 111 and traffic channel group 113. RAN controller 125 derives a MUGI by combining individual MUIs of targeted MUs (such as MU 101) for which signaling awaits transmission. RAN controller 125 then transmits, via transceiver 127 and channel group 111, combined signaling comprising the derived MUGI.

MU processing unit 105 receives, via channel group 111 and transceiver 107, the combined signaling comprising the MUGI. Processing unit 105 then determines whether the MUGI could have been derived from an MUI of MU 101 in combination with one or more other MUIs of other MUs. Depending on the embodiment, this determination may simply involve performing a bitwise logical AND of the MUGI and an MUI of MU 101 to see if the MUI results. This of course works for embodiments in which the individual MUIs are bitwise ORed together to derive the MUGI.

Also, for simplicity it is desirable that MU 101 and RAN 121 use the same identifier (or identifier portion) and derivational process to derive the MUI used by MU 101. As a matter of implementation, MU 101 will probably store the MUI that it uses for quick retrieval whenever the MUI is needed rather than deriving it over and over. However, in some embodiments, MU 101 may store/derive multiple MUIs, perhaps based on different MU identifiers and/or different derivational processes, for MUGI-based signaling with different RANs, for different applications, using different channels, or for different RAN operating conditions.

When processing unit 105 determines that the MUGI could have been derived from a MUI of MU 101, processing unit 105 processes the combined signaling as directed to MU 101. The combined signaling can take a variety of forms. The signaling may comprise control messaging on a shared or common control channel. It may also comprise signaling over a paging channel (PCH), such as paging messages, broadcast messages, SMS messages, and/or VMN messages. As an example, combined signaling using a MUGI will be described below for the case of paging a group of MUs using a group page message.

FIG. 2 is a block diagram depiction of group page message 200 in accordance with multiple embodiments of the present invention. Generally, in addition to a MUGI, a group page message may include many assorted indications to the ad-hoc group of MUs targeted. Some examples that may be included, depending on the embodiment, follow: an indication of whether an acknowledgment to a response to the group page message should be requested by a responding MU, an indication of a persistence level with which a responding MU should respond to the group page message (the persistence level may be based on an estimated size of the group of MUs that may respond to the group page message, including the number targeted by the MUGI and/or expected to false), an indication of what type of signaling in response to the group page message is requested from a responding MU, an indication of a communication service to which the group page message pertains (this may take the form of a compressed service option field that only includes the most often used service options, e.g.), an indication to switch to an unslotted mode, an indication to switch to a semi-dormant mode, an indication to switch to a page monitoring mode using an RSCI (reduced slot cycle index), and an indication of whether the group page message is the last group page message in the present paging slot.

As a specific example, group page message 200 is presented as a "single frame" (i.e., 20 ms) message to be sent on a full-rate (9600 bps) PCH. The message can also be employed as a two (consecutive) frame message to be sent on a half-rate (4800 bps) PCH. Either way, the information payload is intended be the same, 138 bits.

The MUGI of message 200 is depicted as HB1_BITMAP_29, HB1_BITMAP_31, HB1_BITMAP_33, and HB1_BITMAP_35. Thus, the MUGI of message 200 is in accordance with the embodiments of a 4-bitmap MUGI described above. A specific description of the bit definitions for the information payload follow:

RESERVED—Reserved.
The base station sets this field to '00'.

ACK_REQ—Acknowledgment Required.
The base station sets this field to '1' if the response to this message is to be sent by the mobile station in assured mode; otherwise, the base station sets this field to '0'.

PERSISTENCE—Persistence Level.
The base station sets this field to '0' if the response to this message is not required (ACK_REQ was set to '0') or if the response to this message is required (ACK_REQ was set to '1') to be sent using the same persistence level as the Page Response Message. The base station sets this field to '1', if the response to this message is to be sent by the mobile station using the lowest allowed persistence level for that mobile station.

RESPONSE_MSG—Response Message
The base station sets this field '0' if the requested response is a BS Ack or Radio Environment Report Message; the base station sets this field to '1' if the requested response is a Page Response Message.

SERVICE_ID—Id of the Service
The base station sets this field according to the definitions in the applicable standard.

GRP_PGS_DONE—No more messages in the page slot indicator.
The base station sets this field to '1' if this message is the last Group Page Message in the paging slot; otherwise the base station sets this field to '0'.

HB1_BITMAP_29—Hash Bucket Number 1.
For each mobile station that is paged, the base station computes the number i=1+(IMSI mod 29) and sets the $i^{th}$ bit (from the left) of this field to '1'. The base station sets to '0', all the other bits in the field.

HB2_BITMAP_31—Hash Bucket Number 2.
For each mobile station that is paged, the base station computes the number i=1+(IMSI mod 31) and sets the $i^{th}$ bit (from the left) of this field to '1'. The base station sets to '0', all the other bits in the field.

HB3_BITMAP_33—Hash Bucket Number 3.
For each mobile station that is paged, the base station computes the number i=1+(IMSI mod 33) and sets the $i^{th}$ bit (from the left) of this field to '1'. The base station sets to '0', all the other bits in the field.

HB4_BITMAP_35—Hash Bucket Number 4.
For each mobile station that is paged, the base station computes the number i=1+(IMSI mod 35) and sets the $i^{th}$ bit (from the left) of this field to '1'. The base station sets to '0', all the other bits in the field.

Figure 3:
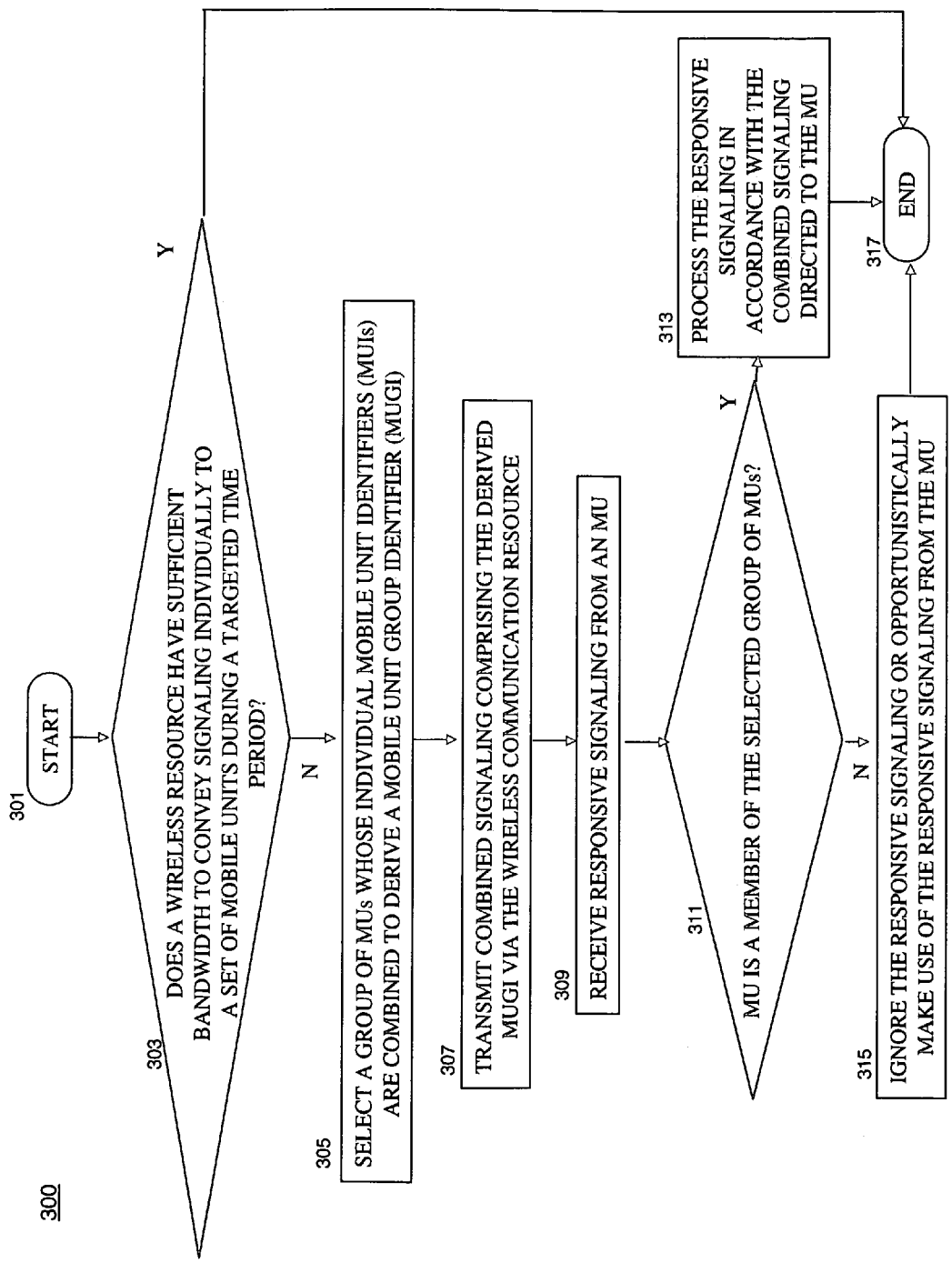
FIG. 3 is a logic flow diagram of functionality performed by a radio access network (RAN) in accordance with multiple embodiments of the present invention.

FIG. 3 is a logic flow diagram of functionality performed by a RAN in accordance with multiple embodiments of the present invention. For some embodiments, logic flow 300 begins (301) with the RAN determining (303) that a wireless communication resource has insufficient bandwidth to convey signaling individually to a group of MUs during a targeted time period. For example, in the case of PCH signaling, the RAN may determine that there are more pages to be transmitted during a paging slot than PCH bandwidth will allow if the pages are transmitted individually. Another example would be situations where the targeted time period is not necessarily a paging slot but is dictated by user expectations of how responsive the system or application should be.

The RAN then selects (305) an ad-hoc group of MUs to target as a group. Determining how many and which MUs to target can depend on many different combinations of factors depending on the embodiment. Some potential factors include the following: whether a quick paging channel (QPCH) is provided in a paging area, a transmit power level of the QPCH, a slot cycle index (SCI) used in the paging area, a present loading level of an access channel (ACH) associated with the communication resource, a number of MUs known to be registered in the paging area, a number of MUs known to be registered in the paging area that also support group signaling of MUs, which communication service is targeted, a present loading level of the communication resource (e.g., how many MUs need to be signaled in the target time period), and/or an estimated number of MUs that may respond (those targeted and/or those potentially falsing).

In addition to these, there also may be some factors that would eliminate a potential MU from being included in the ad-hoc group targeted. Some of these factors include the following: a service class associated with the potential MU, whether the potential MU has been recently targeted by an ad-hoc group but did not respond, a battery level of the potential MU, a plugged-in/battery-only operating mode of the potential MU, and/or the number of other MUs expected to false if the potential MU is included (the RAN may be able to check its list of MUs in the paging area, such as semi-dormant MUs, to predict possible falsing).

In contrast, there also may be some factors that would provide a strong reason for including a potential MU in the ad-hoc group. Some of these factors include the following: the potential MU is a member of a PTT (push-to-talk) group that is being signaled, the potential MU has low priority signaling awaiting transmission, the potential MU needs to be paged for a multicast, and/or the potential MU has a presence update request awaiting transmission.

Having selected the ad-hoc group of MUs, the RAN derives a MUGI by combining the MUIs associated with the selected MUs. The RAN then transmits (307) combined signaling comprising the derived MUGI via the wireless communication resource. In response, the RAN receives (309) signaling from an MU and determines (311) whether the responding MU is a selected member of the ad-hoc group targeted by the MUGI or a falsing MU. In the case where the responding MU was a member of the ad-hoc group, the RAN processes (313) the responsive signaling in accordance with the combined signaling directed to the MU.

However, in the case where the responding MU is falsing, the RAN may either ignore (315) the responsive signaling or opportunistically make use of it. For example, the RAN may perform one or more of the following actions in response to the signaling from the falsing MU: update the location of the MU, register the falsing MU, perform a semi-dormant update for the falsing MU, signal the falsing MU, and/or interpret the responsive signaling from the falsing MU as a presence update. Thus, logic flow 300 ends (317); however, in order to perform the signaling of an ad-hoc group of MUs, functionality not depicted in FIG. 3 may be additionally performed while certain depicted functionality may not be performed, depending on the particular embodiment of the present invention.

Figure 4:
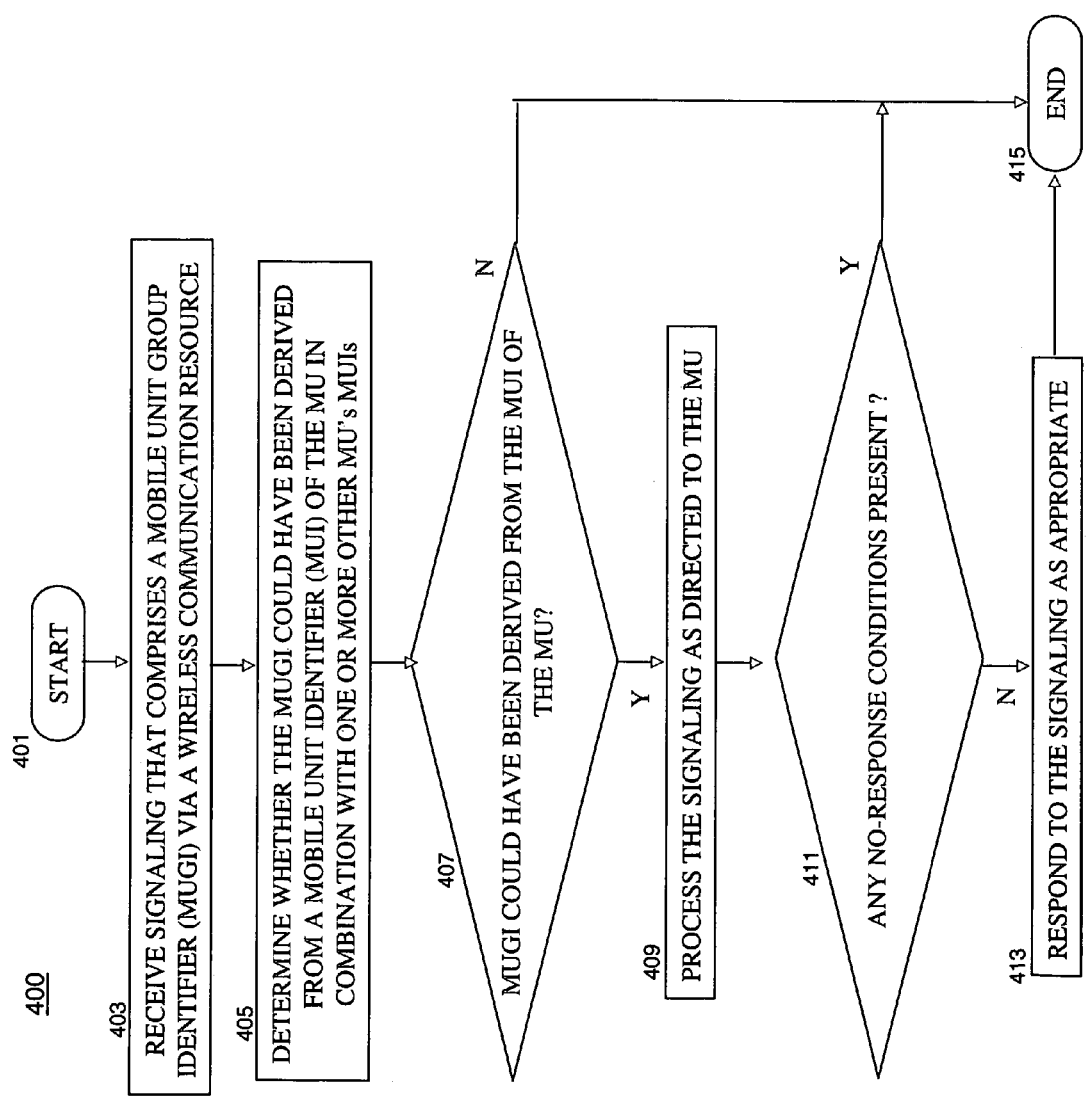
FIG. 4 is a logic flow diagram of functionality performed by a mobile unit (MU) in accordance with multiple embodiments of the present invention.

FIG. 4 is a logic flow diagram of functionality performed by a mobile unit (MU) in accordance with multiple embodiments of the present invention. Logic flow 400 begins (401) with the MU receiving (403) signaling that comprises a MUGI via a wireless communication resource. The MU determines (405) whether the MUGI could have been derived from an MUI of the MU in combination with one or more other MU's MUIs. If (407) so, the MU processes (409) the signaling as directed to the MU.

However, depending on whether (411) certain conditions are present, the MU may either respond (413) to the signaling as appropriate or determine not to respond. Some conditions that may cause the MU to not respond include the following: the MU has a low battery, the MU has an associated service class that provides enhanced battery life, the MU does not participate in a communication service indicated by the signaling, and/or the MU detects subsequent signaling that indicates that another MU responded to the signaling (e.g., another MU that derives the same MUI). Thus, logic flow 400 ends (415); however, in order to perform the receiving of signaling for an ad-hoc group of MUs, functionality not depicted in FIG. 4 may be additionally performed while certain depicted functionality may not be performed, depending on the particular embodiment of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for signaling an ad-hoc group of mobile units (MUs), the method comprising:
    deriving a mobile unit group identifier (MUGI) by combining individual mobile unit identifiers (MUIs) of a plurality of MUs for which signaling awaits transmission via a wireless communication resource; and
    transmitting, via the wireless communication resource, combined signaling comprising the derived MUGI, wherein the combined signaling comprises the MUGI and at least one paging indicator selected from the group consisting of:
        an indication of whether an acknowledgment to a response to the combined signaling is to be requested by a responding MU,
        an indication of what type of signaling in response to the combined signaling is requested from a responding MU,
        an indication of a persistence level with which a responding MU should respond to the combined signaling,
        an indication of a communication service to which the combined signaling pertains,
        an indication to switch to an unslotted mode,
        an indication to switch to a semi-dormant mode,
        an indication to switch to a page monitoring mode using a reduced slot cycle index, and
        an indication of whether the combined signaling is a last combined signaling in a present paging slot.

2. The method of claim 1 further comprising:
    determining, prior to transmitting the combined signaling, that the wireless communication resource has insufficient bandwidth to convey signaling individually to the plurality of MUs during a targeted time period.

3. The method of claim 2 wherein the targeted time period comprises a paging slot.

4. The method of claim 1 wherein the wireless communication resource comprises a channel selected from the group consisting of: a paging channel, a shared control channel, and a common control channel.

5. The method of claim 1 wherein the MUI of each MU of the plurality of MUs is derived from an identifier of each MU selected from the group consisting of:
    an international mobile subscriber identity,
    an international mobile equipment identifier,
    a mobile equipment identifier,
    an electronic serial number,
    a user identity module identifier,
    a UMTS subscriber information module identifier,
    a subscriber identity module identifier,
    a temporary subscription identifier,
    a media access control identifier,
    a Unicast Access Terminal Identifier, and
    an Internet Protocol address.

6. The method of claim 1 wherein combining individual MUIs comprises performing a bitwise logical OR of all the individual MUIs.

7. The method of claim 1 wherein deriving the MUGI comprises hashing at least a portion of each identifier of the plurality of MUs to produce the individual MUIs.

8. The method of claim 7 wherein the MUGI comprises a portion having M bits, wherein an nth bit of the M bits is set for each MU of the plurality of MUs and wherein n, for each MU of the plurality of MUs, equals one plus modulo M of an identifier of the respective MU.

9. The method of claim 8 wherein the MUGI comprises a first portion in which M=29, a second portion in which M=31, a third portion in which M=33, and a fourth portion in which M=35.

10. The method of claim 1 wherein transmitting combined signaling comprises paging a group of MUs using a group page message.

11. The method of claim 1 wherein the persistence level indicated is based on an estimated size of a group of MUs that may respond to the combined signaling.

12. The method of claim 1 wherein the indication of the communication service to which the combined signaling pertains comprises a compressed service option indicator.

13. The method of claim 1 further comprising:
    selecting the plurality of MUs, whose MUIs will be used to derive the MUGI, based on at least one factor selected from the group consisting of:
        whether a quick paging channel (QPCH) is provided in a paging area,
        a transmit power level of the QPCH,
        a slot cycle index used in the paging area,
        a present loading level of an access channel associated with the wireless communication resource,
        a number of MUs known to be registered in the paging area, a number of MUs known to be registered in the paging area that also support group signaling of MUs,
what communication service is targeted,
a present loading level of the wireless communication resource, and
an estimated number of MUs that may respond to signaling comprising a MUGI resulting from a given plurality of MUs.

14. The method of claim 1 further comprising:
determining to exclude a potential MU from the plurality of MUs, whose MUIs will be used to derive the MUGI, based on at least one factor selected from the group consisting of:
a service class associated with the potential MU,
whether the potential MU has been included in an earlier plurality of MUs, whose MUIs were used to derive an earlier MUGI, for which no response was received,
a battery level of the potential MU,
a plugged-in/battery-only operating mode of the potential MU, and
a number of other MUs expected to false if the potential MU is included in the plurality of MUs.

15. The method of claim 1 further comprising:
determining to include a potential MU in the plurality of MUs, whose MUIs will be used to derive the MUGI, based on at least one factor selected from the group consisting of:
whether the potential MU is a member of a push-to-talk group that is being signaled,
whether the potential MU has low priority signaling awaiting transmission,
whether the potential MU needs to be paged for a multicast, and
whether the potential MU has a presence update request awaiting transmission.

16. The method of claim 1 further comprising:
receiving responsive signaling from an MU ambiguously addressed by the MUGI but not a member of the plurality of MUs, whose MUIs were used to derive the MUGI, wherein the MU ambiguously addressed is a falsing MU; and
in response to the responsive signaling, performing at least one step selected from the group consisting of:
updating a location of the falsing MU,
registering the falsing MU,
performing a semi-dormant update for the falsing MU,
signaling the falsing MU,
interpreting the responsive signaling from the falsing MU as a presence update, and
ignoring the responsive signaling from the falsing MU.

17. A method for receiving signaling directed to an ad-hoc group of mobile units, the method comprising:
receiving, by a mobile unit (MU) via a wireless communication resource, signaling that comprises a mobile unit group identifier (MUGI);
determining, by the MU, whether the MUGI is derived from a mobile unit identifier (MUI) of the MU in combination with at least one other MUI from at least one other MU; and
when the MU determines that the MUGI is derived from the MUI of the MU, processing the signaling as directed to the MU;
wherein determining whether the MUGI is derived from the MUI of the MU comprises performing a bitwise logical AND of the MUGI and the MUI of the MU.

18. The method of claim 17 wherein the MUI of the MU is derived by hashing at least a portion of an identifier of the MU.

19. The method of claim 17 wherein the MUGI comprises a portion having M bits, wherein an nth bit of the M bits is set for each MU whose MUI is combined into the MUGI, and wherein n, for each MU, equals one plus modulo M of an identifier of the respective MU.

20. The method of claim 17 further comprising:
when the MU determines that the MUGI is derived from the MUI of the MU, determining not to send a response to the signaling based on at least one condition selected from the group consisting of:
whether the MU has a low battery,
whether the MU has an associated service class that provides enhanced battery life,
whether the MU does not participate in a communication service indicated by the signaling, and
whether the MU detects subsequent signaling that indicates that another MU responded to the signaling.

21. A radio access network comprising:
a transceiver; and
a controller, communicatively coupled to the transceiver,
for deriving a mobile unit group identifier (MUGI) by combining individual mobile unit identifiers of a plurality of mobile units (MUs) for which signaling awaits transmission via a wireless communication resource; and
for transmitting, via the transceiver and the wireless communication resource, combined signaling comprising the derived MUGI, wherein the combined signaling comprises the MUGI and at least one paging indicator selected from the group consisting of:
an indication of whether an acknowledgment to a response to the combined signaling is to be requested by a responding MU,
an indication of what type of signaling in response to the combined signaling is requested from a responding MU,
an indication of a persistence level with which a responding MU should respond to the combined signaling,
an indication of a communication service to which the combined signaling pertains,
an indication to switch to an unslotted mode,
an indication to switch to a semi-dormant mode,
an indication to switch to a page monitoring mode using a reduced slot cycle index, and
an indication of whether the combined signaling is a last combined signaling in a present paging slot.

22. A mobile unit (MU) comprising:
a transceiver; and
a processing unit, communicatively coupled to the transceiver,
for receiving, via a wireless communication resource and the transceiver, signaling that comprises a mobile unit group identifier (MUGI),
for determining whether the MUGI is derived from a mobile unit identifier (MUI) of the MU in combination with at least one other MUI from at least one other MU, and
for processing the signaling as directed to the MU when the MU determines that the MUGI is derived from the MUI of the MU,
wherein determining whether the MUGI is derived from the MUI of the MU comprises performing a bitwise logical AND of the MUGI and the MUI of the MU.

* * * * *